(12) United States Patent
Kellner et al.

(10) Patent No.: US 12,542,333 B2
(45) Date of Patent: Feb. 3, 2026

(54) HIGH-VOLTAGE BATTERY MODULE AND METHOD FOR PRODUCING A COOLABLE HIGH-VOLTAGE BATTERY MODULE WITH BUSBAR INTEGRATION

(71) Applicant: Dr. Ing. h.c. F. Porsche Aktiengesellschaft, Stuttgart (DE)

(72) Inventors: Philipp Kellner, Renningen (DE); Christopher Volkmer, Niefern-Öschelbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 621 days.

(21) Appl. No.: 17/989,855

(22) Filed: Nov. 18, 2022

(65) Prior Publication Data

US 2023/0163423 A1    May 25, 2023

(30) Foreign Application Priority Data

Nov. 22, 2021    (DE) .......................... 102021130443.1

(51) Int. Cl.
*H01M 50/505*    (2021.01)
*H01M 10/647*    (2014.01)
(Continued)

(52) U.S. Cl.
CPC ....... *H01M 50/505* (2021.01); *H01M 10/647* (2015.04); *H01M 10/653* (2015.04);
(Continued)

(58) Field of Classification Search
CPC ............. H01M 10/653; H01M 50/176; H01M 50/178; H01M 50/105; H01M 50/103; H01M 10/647; H01M 50/516
See application file for complete search history.

(56) References Cited

U.S. PATENT DOCUMENTS

| 8,475,951 B2 | 7/2013 | Ueshima et al. |
| 10,003,112 B1 | 6/2018 | Boor et al. |

(Continued)

FOREIGN PATENT DOCUMENTS

| CN | 113314784 A | 8/2021 |
| DE | 102009011659 A1 | 9/2009 |

(Continued)

*Primary Examiner* — Basia A Ridley
*Assistant Examiner* — Heng M. Chan
(74) *Attorney, Agent, or Firm* — Buchanan Ingersoll & Rooney PC

(57) ABSTRACT

A high-voltage battery module includes a module housing, a cell stack which includes a plurality of cells having respective cell terminals, and an end plate which is disposed on at least one end face of the module housing and in which the at least one busbar is integrated. At least one longitudinal side of the module housing is connected to a cooling plate. The end plate is made of an electrically insulating material. The at least one busbar includes at least one electrical contacting surface toward an outer side of the end plate and at least one thermal contacting surface toward at least one edge of the end plate. The at least one thermal contacting surface of the at least one busbar is thermally connected to the at least one longitudinal side of the module housing connected to the cooling plate.

8 Claims, 4 Drawing Sheets

Figure 1:
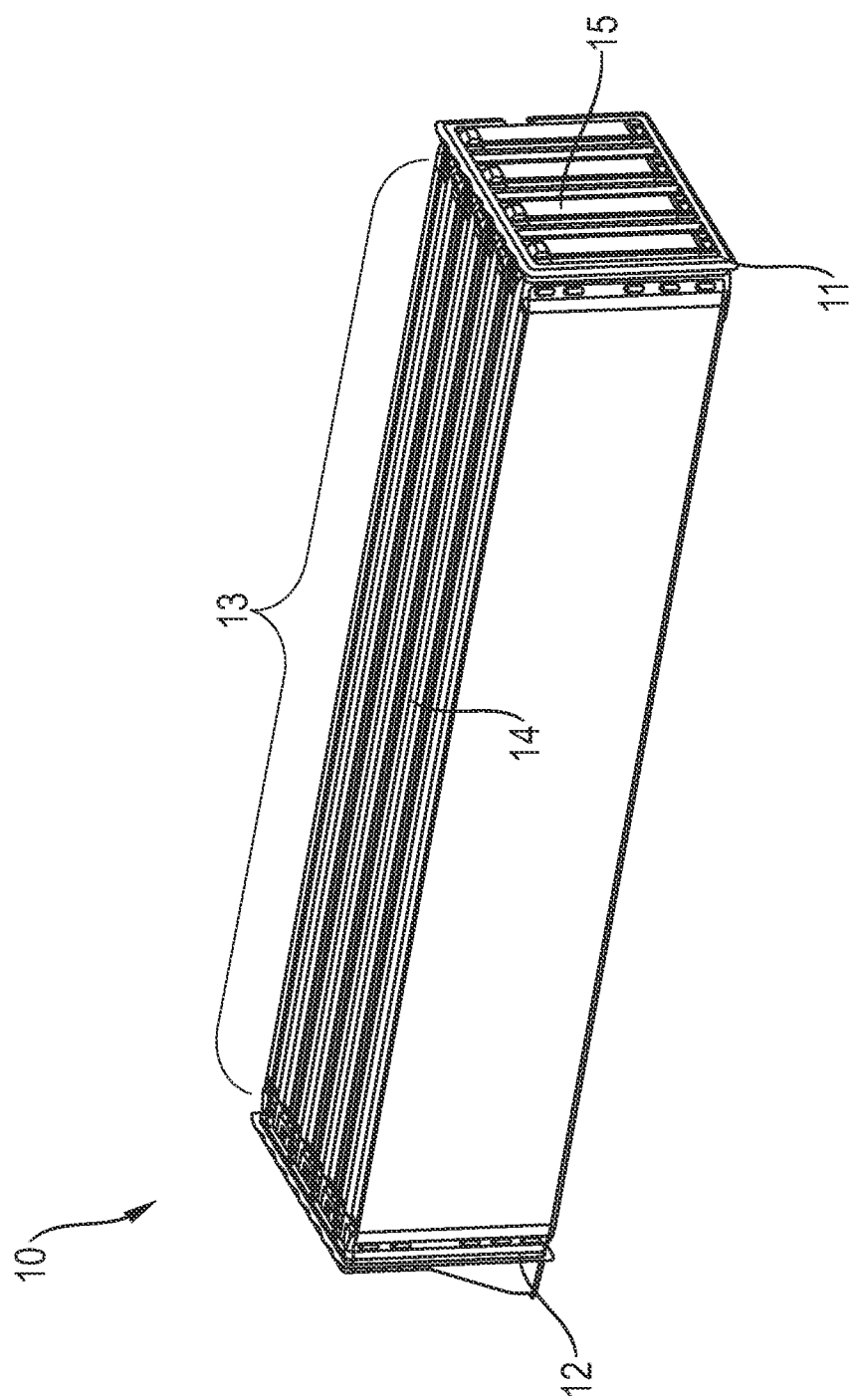

(51) Int. Cl.
    *H01M 10/653*    (2014.01)
    *H01M 50/103*    (2021.01)
    *H01M 50/105*    (2021.01)
    *H01M 50/176*    (2021.01)
    *H01M 50/178*    (2021.01)
    *H01M 50/516*    (2021.01)

(52) U.S. Cl.
    CPC ....... *H01M 50/103* (2021.01); *H01M 50/105* (2021.01); *H01M 50/176* (2021.01); *H01M 50/178* (2021.01); *H01M 50/516* (2021.01)

(56)    References Cited

U.S. PATENT DOCUMENTS

| | | | |
|---|---|---|---|
| 10,637,112 | B2 | 4/2020 | Shin et al. |
| 2020/0313260 | A1 | 10/2020 | Wang et al. |
| 2022/0166084 | A1* | 5/2022 | Park .................... H01M 10/653 |

FOREIGN PATENT DOCUMENTS

| | | | | |
|---|---|---|---|---|
| DE | 102018130558 A1 | 6/2019 | | |
| DE | 102020103126 A1 | 10/2020 | | |
| JP | 3702149 B2 | 10/2005 | | |
| WO | WO-2021010615 A1 * | 1/2021 | ............ | H01M 50/24 |

* cited by examiner

HIGH-VOLTAGE BATTERY MODULE AND METHOD FOR PRODUCING A COOLABLE HIGH-VOLTAGE BATTERY MODULE WITH BUSBAR INTEGRATION

CROSS-REFERENCE TO RELATED APPLICATION

This application claims priority to German Patent Application No. 10 2021 130 443.1, filed Nov. 22, 2021, the content of such application being incorporated by reference herein in its entirety.

FIELD OF THE INVENTION

The present invention relates to a coolable high-voltage battery module, in which at least one busbar is integrated into an end plate disposed on the end face side. A method for producing the high-voltage battery module with busbar integration is described as well.

BACKGROUND OF THE INVENTION

Battery cells in electrically or partially electrically operated motor vehicles are actively cooled in the prior art, because, in particular at higher outputs, they can heat up so much that they are damaged. In the cooling systems used for this purpose, a distinction can generally be made between two approaches which are based, on the one hand, on a direct flow of a dielectric fluid around the battery cells and, on the other hand, on cooling of the battery cells by means of a self-contained cooling system, e.g., a flooded cooling plate, to which the battery cells are connected in a thermally conductive manner. In the aforementioned second case with thermal connection, in the prior art one or more sides of the battery cell are thermally connected to the cooling plates, e.g., via a thermally conductive paste, but not an electrical connector or a high-voltage terminal of the battery cell, also referred to as a cell tab.

A known design of the battery cell is the so-called pouch cell, also referred to in German as "Taschenzelle", in which, for example, a flat lithium-ion accumulator is welded in between two films. The cell tab is disposed toward an end face of the pouch cell, for example, and during further assembly is connected to a busbar to form a high-voltage battery module. A significant portion of the heat generation comes from these cell tabs and busbars, whereby there is also a heat input into the cells and these are heated locally in the region of the cell tabs. However, cell tabs are difficult to connect to the cooling system in terms of installation space.

DE 10 2009 011 659 A1, which is incorporated herein by reference, discloses a system comprising a plurality of busbars which are connected to an end plate and also the cooling system, and are thermally connected to a battery component. Insulating plates are disposed between the busbars.

DE 10 2018 130 558 A1, which is incorporated herein by reference, describes a battery pack comprising a plurality of high-voltage battery modules disposed in rows, which, along or adjacent to the row, includes a backplane comprising multiple busbar assemblies the number of which corresponds to the number of high-voltage battery modules. While poles of the high-voltage battery modules are connected to the busbar assemblies, internal conduits carrying heat transfer fluid extend along the backplane.

DE 10 2020 103 126 A1, which is incorporated herein by reference, discusses a system comprising busbars connected to a cooling system. An insulation component is disposed between the busbars and a cooling plate of the cooling system.

SUMMARY OF THE INVENTION

Described herein is a coolable high-voltage battery module, wherein a cooling capacity is directed from the high-voltage battery module connected to the cooling plates to the busbars and the cell tabs. A connection to the cooling system should be electrically insulated.

A method for producing such a high-voltage battery module is to described as well.

A high-voltage battery module comprises a module housing, a cell stack which includes a plurality of cells comprising respective cell terminals, and an end plate which is disposed on at least one end face of the module housing, wherein at least one busbar is integrated into the end plate. At least one longitudinal side of the module housing is connected to a cooling plate. The end plate is made of an electrically insulating material, wherein the at least one busbar comprises at least one electrical contacting surface toward an outer side of the end plate and at least one thermal contacting surface toward at least one edge of the end plate. The at least one thermal contacting surface of the at least one busbar is thermally connected to the at least one longitudinal side of the module housing connected to the cooling plate. The cell terminals of the respective cells are passed in a material-locking manner through a respective opening of the end plate and welded to the at least one busbar at the at least one electrical contacting surface thereof.

In a preferred configuration of the high-voltage battery module according to aspects of the invention, the cooled longitudinal side of the module housing is orthogonal to the outer side of the end plate, on which the at least one electrical contacting surface of the at least one busbar integrated in the end plate welded to the cell terminals is located. The thermal connection of the at least one thermal contacting surface of the at least one busbar to the module housing or a battery cooling system can be thermally direct or indirect.

The at least one busbar integrated in the end plate advantageously increases the mechanical stability of the end plate. This is also advantageous for assembly processes, in which the cell terminals are passed in a material-locking manner through openings of the end plate in order to then be joined to the busbars.

In one configuration of the high-voltage battery module according to aspects of the invention, each cell is designed as a pouch cell, also referred to in German as a "pocket cell." The at least one busbar is inserted in a form-locking manner into the end plate during a production process of said end plate. The cell terminal of the respective pouch cell, which is also referred to as a cell tab, is passed through the respective opening of the end plate and bent around the at least one busbar for welding to the at least one electrical contacting surface thereof. For cell stacks comprising pouch cells, it is conceivable to dispose the region of the at least one busbar which is thermally connected to the cooled longitudinal side of the module housing between two respective cell tabs.

In a further configuration of the high-voltage battery module according to aspects of the invention, each cell is designed as a prismatic cell. The at least one busbar is inserted into the end plate in a movably mounted manner.

In yet another configuration of the high-voltage battery module according to aspects of the invention, the at least one thermal contacting surface of the at least one busbar and the at least one longitudinal side of the module housing connected to the cooling plate are spaced apart by a tolerance region. This tolerance region is filled with a thermally conductive paste. The tolerance region and a region between cells and module housing can form a contiguous region which can advantageously be filled with thermally conductive paste in a single assembly step.

During assembly of the high-voltage battery module, the thermally conductive paste is pressed or injected into the module housing through filling openings provided for this purpose. This advantageously results in a high rapid charging and discharging capacity of the high-voltage battery module according to aspects of the invention or of a traction battery comprising such high-voltage battery modules.

In a continuing yet further configuration of the high-voltage battery module according to aspects of the invention, the tolerance region and a spatial distancing of the cell stack are situated toward the same longitudinal side of the at least one longitudinal side of the module housing and are both thermally connected to this longitudinal side by a common layer of thermally conductive paste. The end plate comprises a seal which delimits a filling region of the thermally conductive paste inside the module.

In another continuing configuration of the high-voltage battery module according to aspects of the invention, the at least one thermal contacting region of the busbar is provided with an electrically insulating and thermally conductive coating.

In a yet further continuing configuration of the high-voltage battery module according to aspects of the invention, a closing plate is disposed on at least one end face via the end plate. The closing plate is configured to electrically connect the busbars welded to the cell tabs to terminals to a traction system.

As a result of connecting the cooling plate to the at least one busbar and the cell terminals welded thereto, the high-voltage battery module according to aspects of the invention advantageously exhibits increased rapid charging performance or improved rapid charging behavior. The cooling connection furthermore also makes it possible to extract higher outputs from the cell stack during discharging, which advantageously results in improved driving performance.

A method for producing a coolable high-voltage battery module is described as well, wherein the high-voltage battery module comprises a module housing, a plurality of cells comprising respective cell terminals, and, toward at least one end face of the module housing, an end plate comprising at least one busbar. The at least one busbar comprises at least one electrical contacting surface and at least one thermal contacting surface. In a production process, the following steps of producing the high-voltage battery module are carried out:

a) stacking the cells to form a cell stack, the respective cell terminals of which are oriented toward the at least one end face of the module housing;

b) producing the end plate from an electrically insulating material, wherein the at least one busbar is integrated toward an outer side and toward at least one edge of the end plate such that the at least one electrical contacting surface can be contacted from outside the high-voltage battery module and such that the at least one thermal contacting surface can be thermally contacted toward the at least one edge of the end plate, and wherein openings for passing cell terminals through in a material-locking manner are provided between the inner side and the outer side of the end plate;

c) passing the cell terminals of the respective cells through the respective openings of the end plate;

d) joining the cell terminals to the at least one busbar;

e) welding the cell terminals to the at least one electrical contacting surface of the at least one busbar;

f) inserting the cell stack including the end plate into the module housing;

g) introducing a thermally conductive paste between cell stack and thermal contacting surface of the at least one busbar and an inner side of a directly adjacent longitudinal side of the module housing;

h) connecting an outer side of the directly adjacent longitudinal side of the module housing to a cooling plate.

In one embodiment of the method according to aspects of the invention, each cell is designed as a pouch cell. The at least one busbar is inserted in a form-locking manner into the end plate during the production process of said end plate. The joining of the cell terminals to the at least one busbar is carried out by folding the cell terminals until they rest against the at least one busbar. During the production process of the end plate, e.g., in the form of plastic injection molding, the busbars are directly overmolded with an injection molding compound while keeping the at least one electrical contacting surface and the at least one thermal contacting surface free.

In another embodiment of the method according to aspects of the invention, each cell is designed as a prismatic cell. The at least one busbar is inserted into the end plate in a movably mounted manner. During the production process of the end plate, it is formed by means of plastic injection molding, for example. The at least one busbar is not integrated into the end plate in a movably mounted manner until later or after the end plate has hardened.

In a further embodiment of the method according to aspects of the invention, the at least one thermal contacting region of the busbar is provided with an electrically insulating and thermally conductive coating.

Further advantages and embodiments of the invention will emerge from the description and the accompanying drawing.

It goes without saying that the aforementioned features and the features yet to be explained in the following can be used not only in the respectively specified combination, but also in other combinations or on their own, without leaving the scope of the present invention.

BRIEF DESCRIPTION OF THE DRAWING FIGURES

The figures are described in a coherent and comprehensive manner, and the same reference signs are assigned to the same components.

FIG. 1 schematically shows a perspective illustration of a cell stack in one embodiment of the method according to aspects of the invention.

Figure 2:
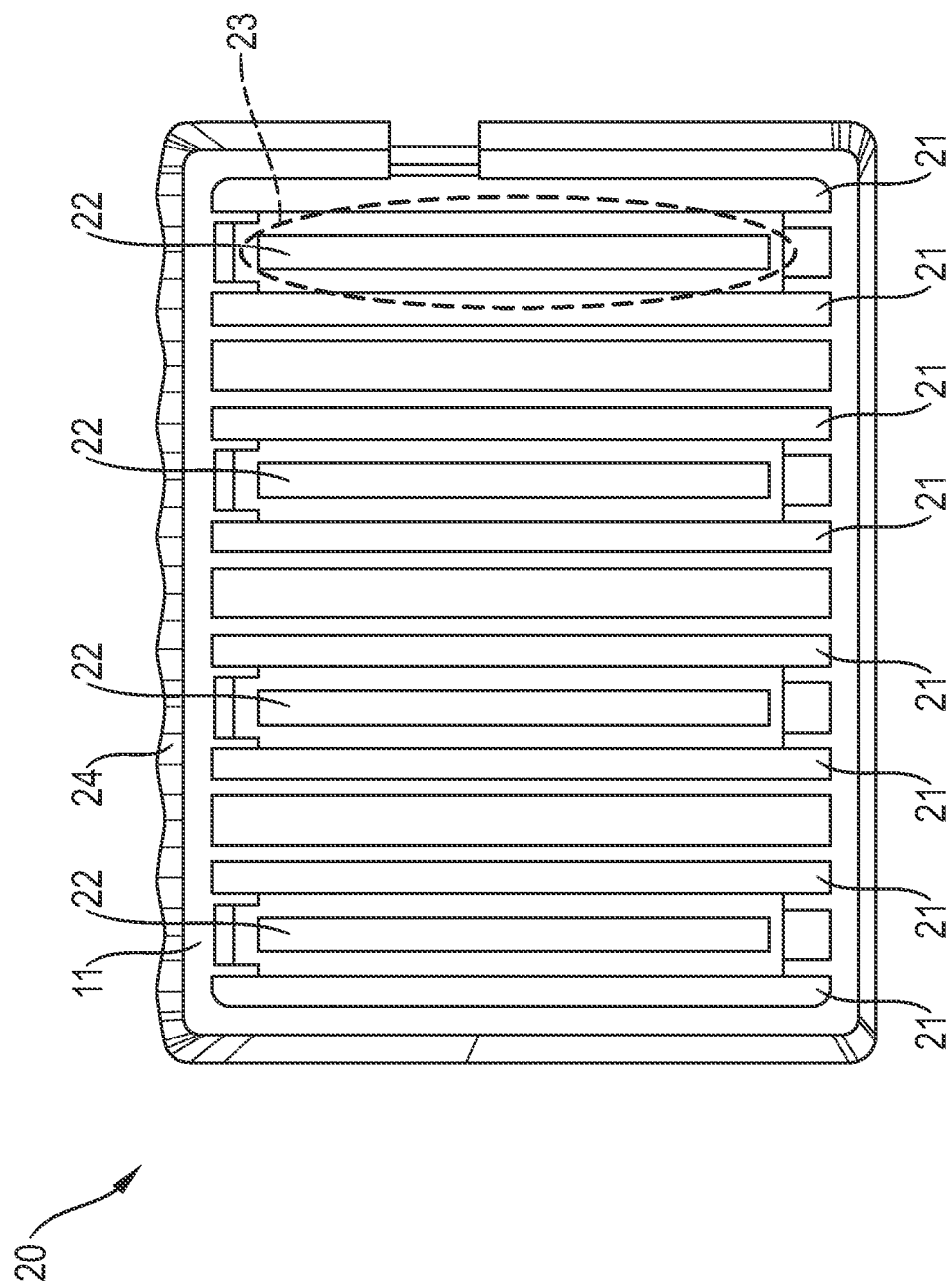

FIG. 2 schematically shows a top view onto an end plate comprising integrated busbars in the embodiment of the method according to aspects of the invention.

Figure 3:
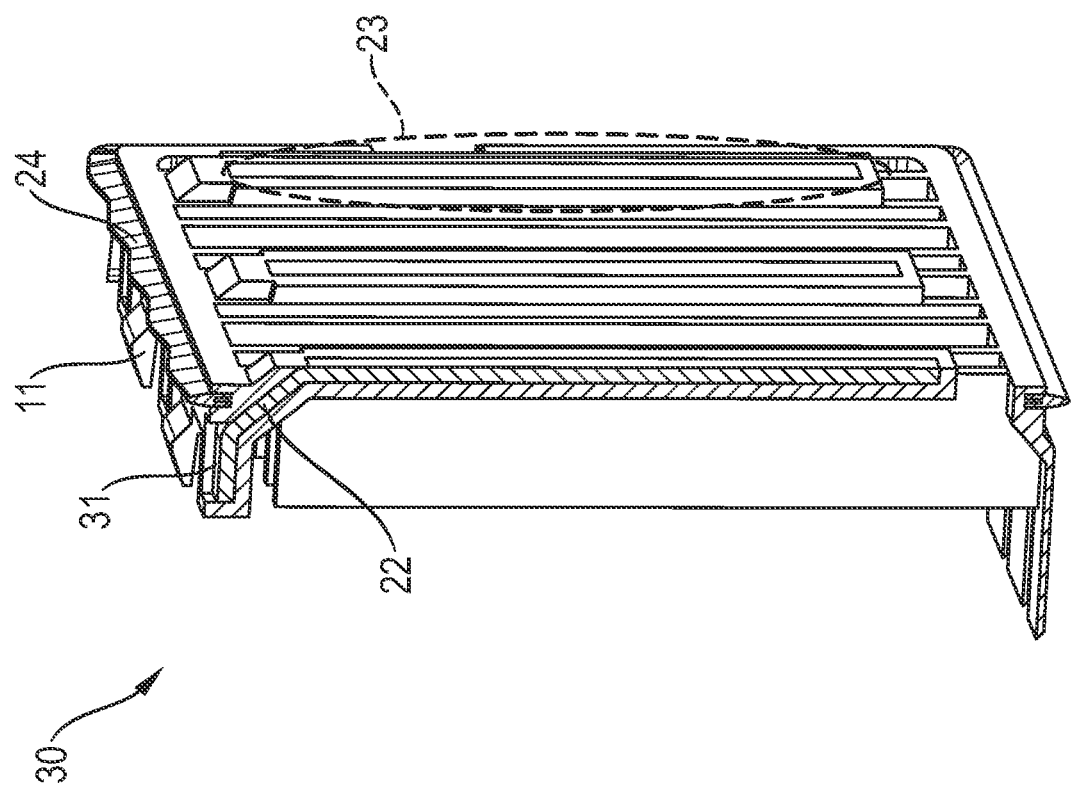

FIG. 3 schematically shows a perspective sectional view of the end plate comprising integrated busbars in the embodiment of the method according to aspects of the invention.

Figure 4:
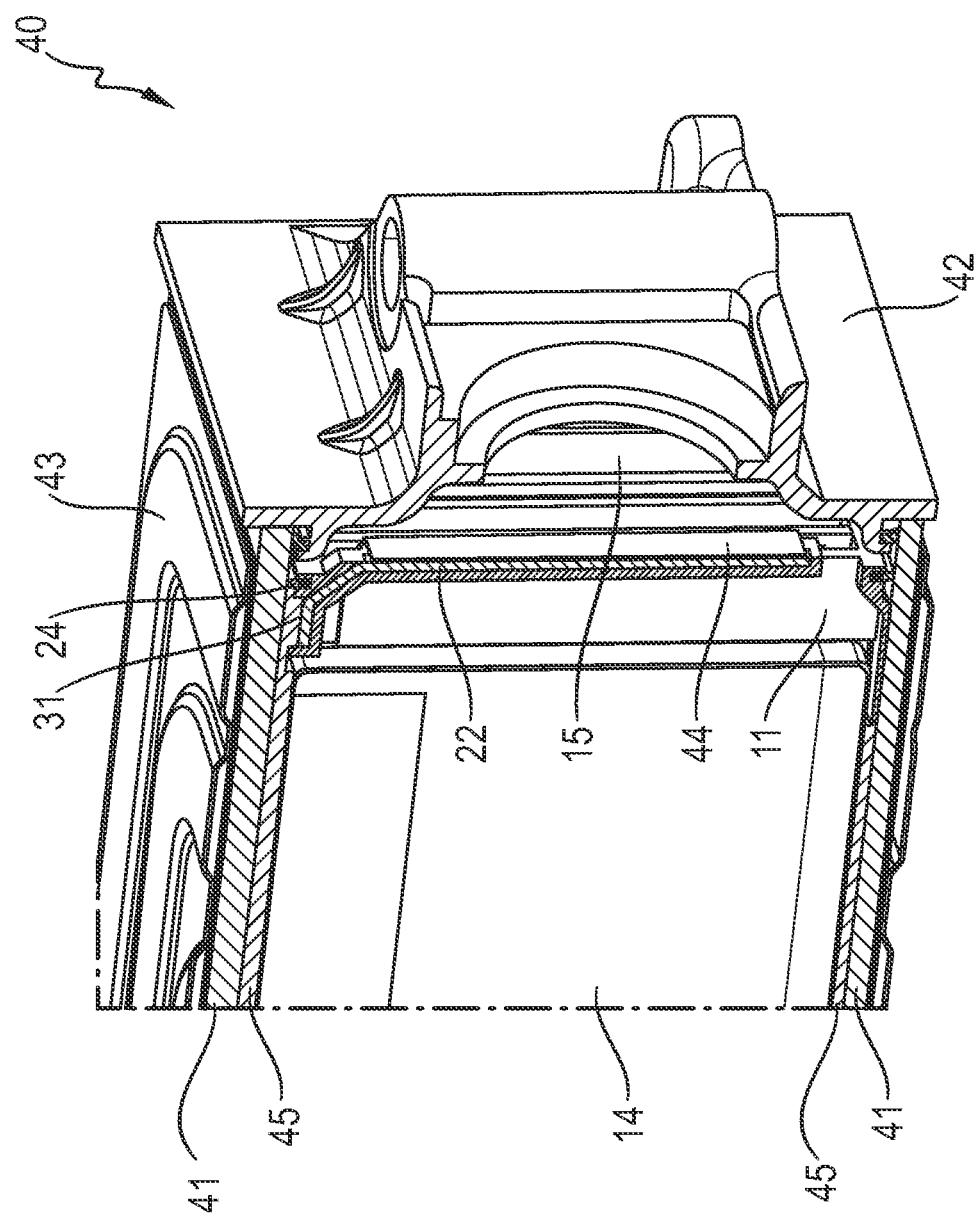

FIG. 4 schematically shows a perspective sectional view of a configuration of the high-voltage battery module according to aspects of the invention.

DETAILED DESCRIPTION OF THE INVENTION

FIG. 1 schematically shows a perspective illustration 10 of a cell stack 13 in one embodiment of the method according to aspects of the invention. A plurality of energy storage cells or cells 14 are combined to form a cell stack 13. In the illustration 10, the cells 14 are designed as pouch cells. The respective cell terminals 15, also referred to in the case of pouch cells as cell tabs, are passed through the end plate 11 disposed on the end face side of the cell stack and welded there. A lower end plate 12 closes the cell stack 13 off to the opposite side.

FIG. 2 schematically shows a top view 20 onto the end plate 11 comprising integrated busbars 22 in the embodiment of the method according to aspects of the invention. Openings 21 are provided in the end plate 11, through which the cell terminals are passed in a material-locking manner. The term "material-locking" means that a respective opening 21 encloses a respective cell terminal without any gap or space. The busbars 22 integrated in the end plate 11 are enclosed by an electrically insulating material of the end plate 11. The electrical contacting surface of the respective busbar 22 that is not covered by the electrically insulating material of the end plate 11 is visible in the top view 20. After the respective cell terminal is passed through the respective opening 21 of the end plate 11, the cell terminal is bent around the respective busbar 22, as shown with reference sign 15 in FIG. 1, and welded to the electrical contacting surface thereof, for example in a region 23. When filling with a thermally conductive paste, a seal 24 restricts the spread of said paste to an interior space of the module.

FIG. 3 schematically shows a perspective sectional view 30 of the end plate 11 comprising integrated busbars 22 in the embodiment of the method according to aspects of the invention. The thermal contacting surface 31 can be seen in the lateral section. Said surface is coated with an electrically insulating but thermally conductive layer, for example. Thermally conductive paste is applied to the thermal contacting surface 31 for better thermal connection to a cooling system.

FIG. 4 schematically shows a perspective sectional view 40 of a configuration of the high-voltage battery module according to aspects of the invention. A respective cell terminal 44 is welded to a respective busbar 22. Cell terminals 15 passed through the end plate 11 adjacent to respective busbars 22 are bent around the respective busbar 22 and welded one above the other. Cells 14 comprising an end plate 11 are disposed in a module housing 41, whereby a cooling plate 43 is located on a longitudinal side of the module housing 41. This arrangement advantageously implemented in such a way that the thermal contacting surface 31 of the busbar 22 is located in the immediate vicinity of the longitudinal side of the module housing provided with the cooling plate 43. Thermally conductive paste 45 is filled between this longitudinal side and the cells 14 or the thermal contacting surface 31 of the busbar 22 and spreads all the way to the seal 24. A closing plate, which electrically connects the cell terminals welded to the busbars to terminals to a traction system, is disposed above the end plate 11 on the end face side.

LIST OF REFERENCE SIGNS

10 View of the cell stack
11 End plate
12 Lower end plate
13 Cell stack
14 Cell
15 Cell terminal welded to busbar
20 Top view of the end plate
21 Openings for cell terminals
22 Busbar
23 Region for cell welding
24 Seal for thermally conductive paste
30 Perspective sectional view of the end plate
31 Thermal contacting surface
40 Perspective sectional view of the high-voltage battery module
41 Module housing
42 Closing plate high-voltage battery module
43 Cooling plate with cooling fins
44 Cell terminal welded to busbar
45 Thermally conductive paste

What is claimed is:

1. A high-voltage battery module comprising:
   a module housing,
   a cooling plate connected to at least one longitudinal side of the module housing,
   a cell stack including a plurality of cells comprising respective cell terminals,
   an end plate disposed on at least one end face of the module housing, wherein the end plate is composed of an electrically insulating material,
   at least one busbar integrated into the end plate, wherein the at least one busbar comprises (i) at least one electrical contacting surface toward an outer side of the end plate and (ii) at least one thermal contacting surface toward at least one edge of the end plate,
   wherein the at least one thermal contacting surface of the at least one busbar is thermally connected to the at least one longitudinal side of the module housing that is connected to the cooling plate,
   wherein the cell terminals of the respective cells are welded to the at least one busbar at the at least one electrical contacting surface thereof,
   wherein the at least one thermal contacting surface of the at least one busbar and the at least one longitudinal side of the module housing connected to the cooling plate are spaced apart by a pre-determined gap that is filled with a thermally conductive paste,
   wherein the pre-determined gap and a space between the cell stack and the at least one longitudinal side of the module housing are filled with a common layer of the thermally conductive paste, and
   wherein the end plate comprises a seal which delimits a filling region of the thermally conductive paste inside the module.

2. The high-voltage battery module according to claim 1, wherein each cell is a pouch cell, and wherein the cell terminal of the respective pouch cell is bent around the at least one busbar and welded to the at least one electrical contacting surface thereof.

3. The high-voltage battery module according to claim 1, wherein each cell is a prismatic cell, and wherein the at least one busbar is moveably mounted to the end plate.

4. The high-voltage battery module according to claim 1, wherein the at least one thermal contacting surface of the busbar includes an electrically insulating and thermally conductive coating.

5. A method for producing a coolable high-voltage battery module, wherein the high-voltage battery module comprises a module housing, a plurality of cells comprising respective cell terminals, and, toward at least one end face of the module housing, an end plate comprising at least one busbar, wherein the at least one busbar comprises at least one electrical contacting surface and at least one thermal contacting surface, wherein said method comprises the steps of:
- stacking the cells to form a cell stack and such that the respective cell terminals of which are oriented toward the at least one end face of the module housing;
- producing the end plate from an electrically insulating material, wherein the at least one busbar is integrated toward an outer side and toward at least one edge of the end plate such that the at least one electrical contacting surface can be contacted from outside the high-voltage battery module and such that the at least one thermal contacting surface can be thermally contacted toward the at least one edge of the end plate;
- forming openings between the inner side and the outer side of the end plate;
- passing the cell terminals of the respective cells through the respective openings of the end plate;
- joining the cell terminals to the at least one busbar;
- welding the cell terminals to the at least one electrical contacting surface of the at least one busbar;
- inserting the cell stack including the end plate into the module housing;
- introducing a thermally conductive paste between the cell stack and the thermal contacting surface of the at least one busbar and an inner side of a directly adjacent longitudinal side of the module housing, wherein the end plate comprises a seal which delimits a filling region of the thermally conductive paste inside the module; and
- connecting an outer side of the directly adjacent longitudinal side of the module housing to a cooling plate.

6. The method according to claim 5, wherein each cell is a pouch cell, wherein the at least one busbar is inserted in a form-locking manner into the end plate during the production process of said end plate, and wherein the joining of the cell terminals to the at least one busbar is carried out by folding the cell terminals until the cell terminals rest against the at least one busbar.

7. The method according to claim 5, wherein each cell is a prismatic cell, and wherein the at least one busbar is inserted into the end plate in a movably mounted manner.

8. The method according to claim 5, wherein at least one thermal contacting region of the busbar is provided with an electrically insulating and thermally conductive coating.

* * * * *